(12) United States Patent
Stefanac et al.

(10) Patent No.: US 6,620,374 B2
(45) Date of Patent: Sep. 16, 2003

(54) INDUCTION HEAT-TREATING OF THREADED FASTENERS WITH A ROTARY CONVEYOR

(75) Inventors: Dean P. Stefanac, Menomonee Falls, WI (US); Thomas J. Bowers, New Berlin, WI (US); Donald H. Wiseman, Waukesha, WI (US); William C. Weller, Menomonee Falls, WI (US)

(73) Assignee: Pillar Industries, Brookfield, WI (US)

( * ) Notice: Subject to any disclaimer, the term of this patent is extended or adjusted under 35 U.S.C. 154(b) by 36 days.

(21) Appl. No.: 09/681,757

(22) Filed: May 31, 2001

(65) Prior Publication Data

US 2002/0179203 A1 Dec. 5, 2002

(51) Int. Cl.⁷ .................................................. C21D 1/62
(52) U.S. Cl. .......................... 266/259; 266/249; 219/650
(58) Field of Search ................................ 266/249, 259; 219/650; 148/567, 573, 574

(56) References Cited

U.S. PATENT DOCUMENTS

| | | | |
|---|---|---|---|
| 2,907,858 A | * 10/1959 | Distler | ........................ 148/559 |
| 3,935,416 A | 1/1976 | Cachat | |
| 3,970,813 A | 7/1976 | Day | |
| 3,988,179 A | 10/1976 | Del Paggio et al. | |
| 4,021,274 A | 5/1977 | Chadwick | |
| 4,184,798 A | 1/1980 | Laughlin | |
| 4,194,728 A | 3/1980 | Stengel et al. | |
| 4,419,149 A | 12/1983 | Day | |
| 4,897,518 A | 1/1990 | Mucha et al. | |
| 5,350,467 A | 9/1994 | Evans | |
| 5,397,876 A | 3/1995 | Shimamoto et al. | |
| 5,536,337 A | 7/1996 | Wei | |
| 5,796,078 A | 8/1998 | Ottenwaelder et al. | |
| 5,820,705 A | 10/1998 | Yu et al. | |
| 6,024,913 A | 2/2000 | Ogawa et al. | |

OTHER PUBLICATIONS

ASM Handbook, vol. 4, Heat Treating, 4–1996.*

* cited by examiner

*Primary Examiner*—Scott Kastler
(74) *Attorney, Agent, or Firm*—Ziolkowski Patent Solutions Group, LLC

(57) ABSTRACT

A system and method for inductively heating and then quench hardening a portion of a workpiece, such as a several threads of a screw or bolt are disclosed. The system includes a conveyor system having a rotary conveyor for separating, aligning, and transporting each of the workpieces in aligned succession through an induction heater positioned about the rotary conveyor to heat-treat at least a portion of each of the workpieces. A sensor determines whether a workpiece is heat-treated to a minimum temperature and causes an ejector to separate heat-treated workpieces that have reached the minimum temperature from heat-treated workpieces that have failed to reach the minimum temperature. The separated workpieces are then quenched in a tank & separately removed automatically.

46 Claims, 11 Drawing Sheets

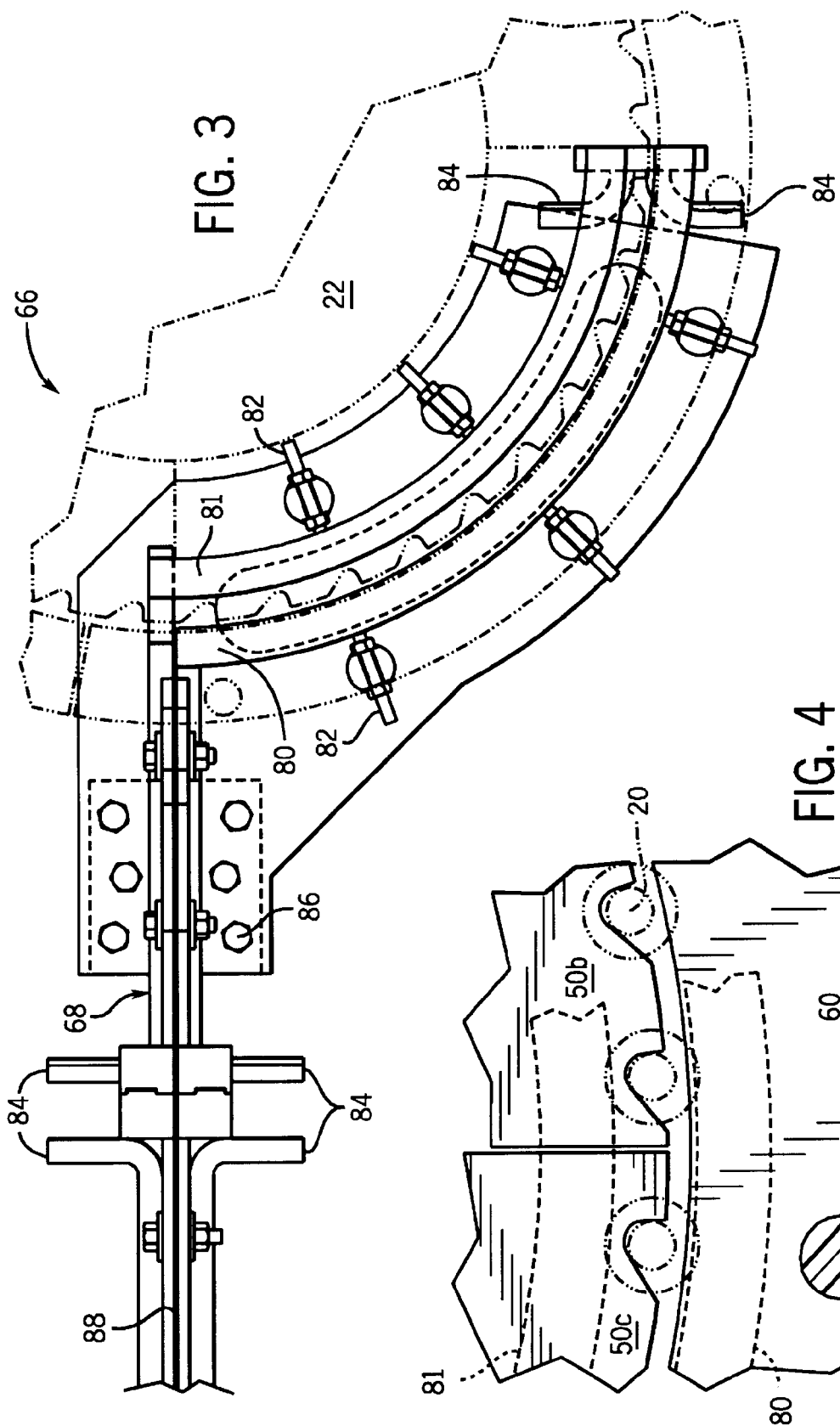

INDUCTION HEAT-TREATING OF THREADED FASTENERS WITH A ROTARY CONVEYOR

BACKGROUND OF INVENTION

This invention relates generally to induction heat treatment, and more particularly, to a device and method for hardening workpieces such as threaded fasteners using a circular conveyor through an induction heating apparatus.

Induction surface hardening of workpieces, such as but not limited to tapping tools and thread-forming screws or bolts, known as self-tapping fasteners, is intended to harden each of the workpieces in a preselected region. The preselected region may comprise a portion of each workpiece or the entire workpiece depending on the type of workpiece heat-treated. Generally, however, it includes the first several threads, as will be more fully described hereinafter.

For thread-forming screws or bolts, it is often desirable to heat-treat only the first 2–4 threads of each workpiece. Generally, this portion comprises a tapered section having several of the thread roots of the workpiece. These thread roots are hardened to perform cutting action or thread-forming action upon entering a substrate to create a threaded region within the substrate. The remainder of the workpiece is then threaded through the newly threaded region of the substrate, thereby providing anchoring support for the substrate and/or objects attached to the substrate.

It is desirable to heat-treat only a portion of these workpieces when forming thread-cutting fasteners rather than an entire threaded area and to prevent the remainder from becoming brittle. A required property for these fasteners is that the remaining portion that is not treated remain ductile so that they do not break when fastened down. That is, although heat-treated and hardened sections become good thread-cutters, the hardened sections do not make good fasteners because they become too brittle. Untreated ductile cores of workpieces have improved strength and torsion characteristics as compared to hardened cores, thereby lessening the likelihood of failure when torquing the fastener, removing the fastener from the substrate, or while the fastener is torqued down.

Another property desired in each of the workpieces is that they be hardened in a specific region to a desired thread root depth, and have a consistent hardness from piece to piece. To the extent that any of the above desired properties are found lacking in a particular workpiece, or from piece to piece, the rate of defects increases and the cost associated with quality control increases.

Induction hardening of workpieces is well-known in the art. One known method to harden threaded fasteners, such as screws and bolts, includes the use of a helical induction coil having the threaded fastener closely coupled thereto. The threaded fastener is axially inserted within the induction coil to a desired depth for heat-treating the workpiece. These devices are not well suited for high production. For workpieces having heads such as bolts or screws, after heating by the closely coupled helical coil, quenching of such workpieces can also be problematic. These workpieces cannot be readily passed through the helical coil to a quench station, but must either be quenched in position or manually removed from the helical coil and carried to a quench tank for cooling.

The process of manually removing workpieces from the helical coil and dropping them into a quench tank is inefficient and slow. Manually removing workpieces after heat-treatment, however, is widely used since the time lapse from discontinued heating of the workpiece to quenching is critical to controlling the uniformity, depth, and hardness levels of the heat-treatment. Also critical is assuring accurate positioning of the workpieces during heat-treating. Minor variations in the alignment and positioning of the workpieces within the induction coil can result in defects, such as brittle threads or inadequate hardening.

Another known method to harden workpieces is the use of a channel-like inductor coil in the form of one or more elongated turns between two parallel sides having workpieces laterally traveling therethrough. This method provides an increased rate at which workpieces can be heat-treated, but causes a reduction in the uniformity of heat-treatment. Such methods typically use gravity to translate the workpieces laterally through the induction coil and to a quenching step after leaving the induction coil. Alternatively, the workpieces can be dropped from the induction coil into a quench tank.

Using gravity to convey the workpieces can cause other problems as well. For example, momentary stoppages in flow, followed by agitated movements of the workpieces, can cause defects as the workpieces pass through the induction coil. When the workpieces travel at different speeds, the time that the workpieces are heat-treated varies resulting in uneven heat-treatment. Additionally, workpieces may overlap one another misaligning the workpieces as they pass through the induction coil. That is, if the head of one fastener rides up on the head of another, the first fastener may be too high or cocked, thereby preventing adequate and/or even heat distribution.

Another known method provides a conveyor system for heat-treating a zone of articles. A feeder bowl supplies workpieces which are translated through an induction heating coil by a first conveyor and then quenched by a liquid spray which directs a cooling liquid onto the heated ends of the workpieces. Alternatively, the workpieces may have their ends dipped into a cool liquid reservoir or be subjected to a blast of cold air or any other type of cooling gas. After the workpieces are heated and quenched, a second conveyor comprising a continuously rotatable table removes the workpieces from the first conveyor at a rate determined by the rotational speed of the rotatable table. The rotatable table determines the rate at which articles pass through the induction coils according to the rate at which articles are removed from the first conveyor. Further methods eliminate the pick-up member by driving the articles through the induction heating coil using the first conveyor. Similar problems exist using these methods as with the other methods discussed. Since the articles are fed by gravity, they can overlap and/or travel at different rates of speed while passing through the induction coil which can result in an increased rate of defects. Additionally, it is difficult to efficiently identify and separate adequately heat-treated workpieces from inadequately heat-treated workpieces. The inability to quickly identify inadequately heat-treated workpieces limits the production rate at which workpieces may be manufactured, and results in the implementation of expensive manual quality control testing and procedures for separating adequately heat-treated workpieces from inadequately heat-treated workpieces.

It would therefore be desirable to have a device and method for heat-treating workpieces, such as threaded fasteners, in which the workpieces are separated and the rate at which they are treated is governed to provide consistent or even heat-treatment.

SUMMARY OF INVENTION

The present invention provides a system and method for hardening and separating workpieces to produce uniformly heat-treated workpieces solving the aforementioned problems.

A rotary conveyor is provided to transport workpieces in succession through an induction heater. The workpieces are aligned so that at least a portion of each workpiece is heat-treated upon passing through the heater, such as an induction heating coil. The rotary conveyor includes individual retention members to separate the workpieces as they travel through the heater. A sensor examines the heat-treated portion of each of the workpieces to determine whether the workpieces are adequately heat-treated. Based on the determination made by a control connected to the sensor, an ejector separates the workpieces into adequately heat-treated or non-defective workpieces, from inadequately heat-treated or defective workpieces. The workpieces are then quenched in a quenching mechanism.

In accordance with one aspect of the present invention, a heat-treating apparatus is disclosed comprising a rotary conveyor having a discrete number of workpiece retainers or slots for carrying the workpieces as they travel around the rotary conveyor from a reception station to a discharge station. The apparatus also comprises a heater, such as an induction heating coil, positioned under the rotary conveyor to heat a workpiece positioned in the workpiece retainer of the rotary conveyor while the workpiece travels from the reception station to the discharge station.

In accordance with another aspect of the present invention, a system to inductively heat and quench-harden at least a portion of a workpiece includes a circular conveyor system and an arc-shaped induction heater positioned adjacent to the circular conveyor system. The arc-shaped induction heater heat-treats at least a portion of each workpiece traveling therethrough on the circular conveyor system. The system also includes a quencher located to receive and cool each workpiece discharged from the circular conveyor system.

In another aspect of the present invention, a control for hardening workpieces is disclosed. The control causes a rotary conveyor to position workpieces in aligned succession and convey the workpieces through an arc-shaped heater. The arc-shaped heater heat-treats the workpieces, which can then be cooled in a quench tank or by another cooling mechanism.

In a further aspect of the present invention, a heat-treating device is provided having a means for rotationally conveying workpieces or threaded fasteners in an aligned succession, and a means for heat-treating the workpieces while being conveyed in the means for rotationally conveying workpieces. If desired, the heat-treating device can also include a means for separating non-defective or adequately heat-treated workpieces from defective or inadequately heat-treated workpieces. The devices preferably also include a means for cooling the workpieces.

In yet another aspect of the present invention, a method of heat-treating a workpiece includes positioning workpieces on a rotatable conveyor system and rotating the rotatable conveyor system such that each workpiece travels through a heater. The heater is designed to apply a heat-treatment to at least a portion of each workpiece while moving through the rotatable conveyor system. The method can also include the step of quenching the workpieces in a quenching mechanism to cool the workpieces.

Various other features, objects and advantages of the present invention will be made apparent from the following detailed description and the drawings.

BRIEF DESCRIPTION OF DRAWINGS

In the drawings:

FIG. 3 is a partial top sectional view taken along lines 3—3 of FIG. 1.

FIG. 4 is a top view of a portion of the rotary conveyor shown in FIGS. 2 and 3.

FIG. 10 is a partial view of the rotary conveyor of FIG. 2 showing a aject mechanism in accordance with the present invention.

FIG. 13 is a side view of a workpiece treated in accordance with the process of the present invention carried out in a device such as that shown in FIGS. 1–12.

DETAILED DESCRIPTION

Figure 1:
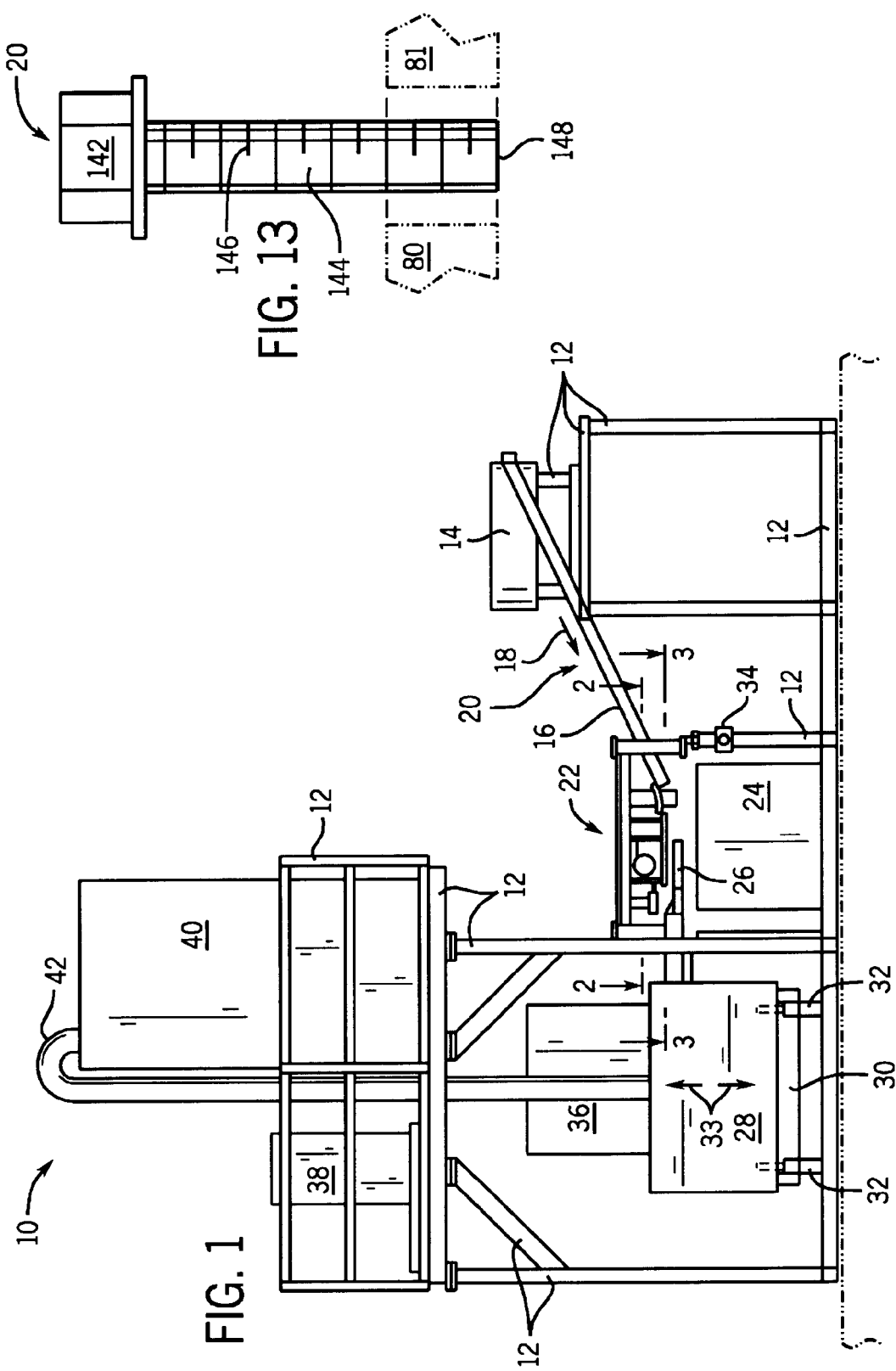
FIG. 1 is a side view of one embodiment of a heat-treating device in accordance with the present invention.

Referring to FIG. 1, the major components of a preferred workpiece heat-treating apparatus 10 incorporating the present invention are shown. The apparatus 10 is housed within support structure 12 and includes a supply bin 14 attached to a feed conveyor or feeder 16. The feed conveyor 16 moves in the direction of arrow 18 and supplies workpieces 20, such as fasteners, screws, bolts, etc., therethrough from the supply bin 14 to a rotary or circular conveyor system shown generally as 22. A quench tank or quencher 24 is located to receive and cool each workpiece 20 discharged from the circular conveyor system 22. A heater 26 is adjacently aligned with the rotary conveyor 22 so as to permit the heating of each of the workpieces 20. The heater 26 is connected to a heat station 28, which supplies power and controls the heating of the heater 26. A lift table or mechanism 30 is configured to reposition the heater 26 relative to the circular conveyor system 22 and is movable along cylindrical supports 32. Cylindrical supports 32 are connected to the lift table 30 and extend and retract to raise or lower heat station 28 in the direction of arrows 33. A hand crank 34 located on support structure 12 can cause the cylindrical supports 32 to fill with hydraulic fluid during extension. Alternatively, the hand crank 34 can cause the removal of hydraulic fluid to retract the cylindrical supports 32, providing a means for coarse adjustment of the heater 26 relative to the circular conveyor system 22. A control system 36 is configured to operate the workpiece heat-treating apparatus 10, which includes a water or cooling system having a water reservoir 38 and cooling lines (not shown) that supply water to the heater 26. A power supply 40 connects via an electric feed conductor 42 to the heat station 28, and supplies power to the heat-treating apparatus 10.

Figure 2:
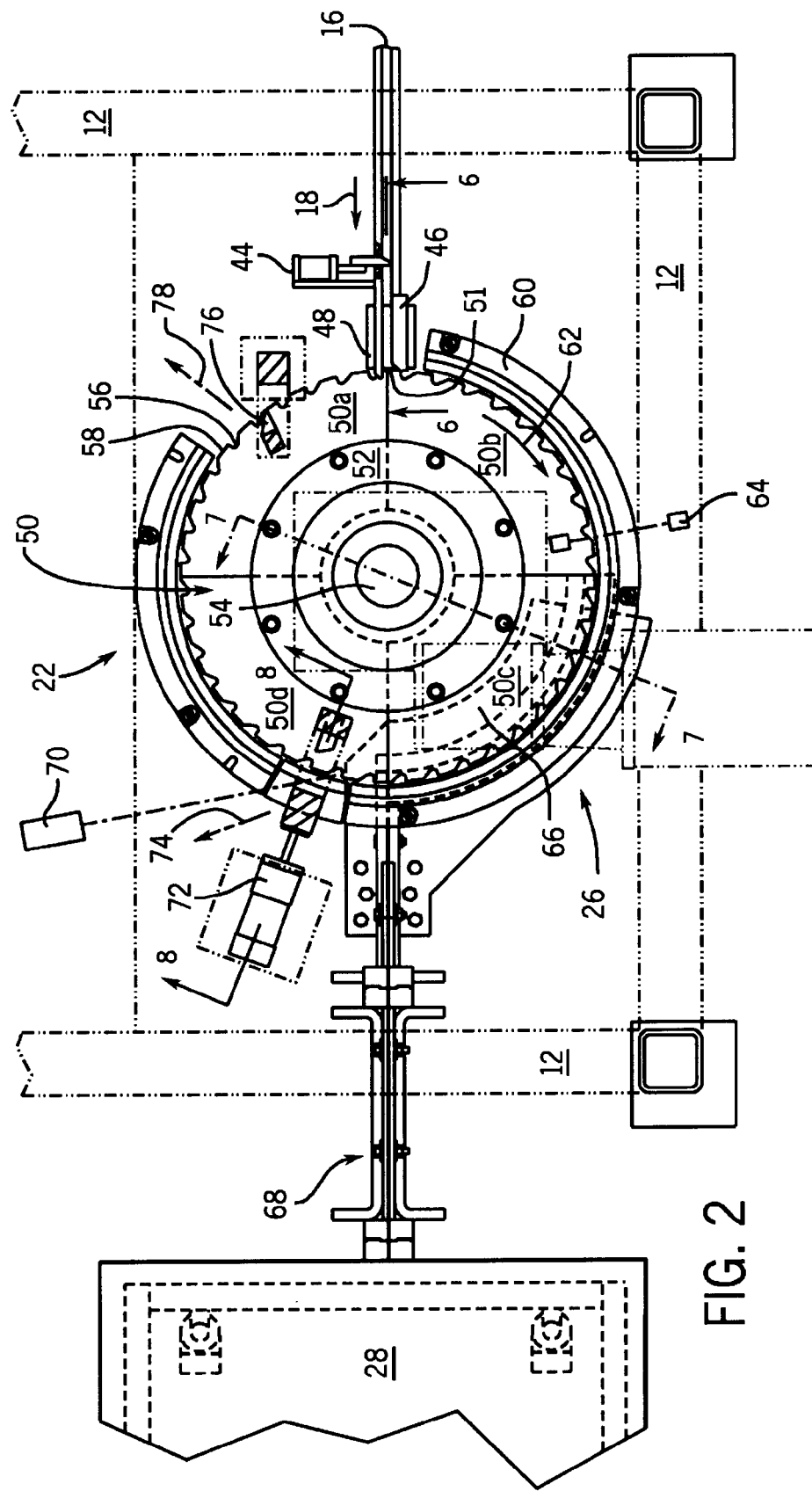
FIG. 2 is a top sectional view taken along line 2—2 of FIG. 1.

Referring now to FIG. 2, a top view of the rotary conveyor 22 taken along line 2—2 of FIG. 1 is shown. A workpiece inflow stop 44 regulates the flow of workpieces 20 along the feed conveyor 16. After passing the stop 44, the workpieces 20 are fed between an overhead confinement guide 46 and a track portion 48, where they are pneumatically propelled from reception station 51 onto a circular plate 50 of the rotary conveyor 22. Alternatively, the feeder 16 may be in operable association with the rotary conveyor 22 to relay the workpieces 20 directly to the relay station 51, eliminating the overhead confinement guide 46 and track portion 48.

The round-table or circular plate 50 may comprise a single circular plate or alternatively be segmented into a plurality of circular plate segments 50*a*, 50*b*, 50*c* and 50*d*, the number of which is based on manufacturability concerns and ease of interchangeability. The plate 50 is connected to an insulating core ring or isolator 52 and a motor driven drive assembly 54. The drive motor 54 rotates the rotary conveyor 22 at a desired and controllable speed. The electrical core ring 52 is positioned between the heater 26 and the rotary conveyor 22 to electrically isolate the drive motor 54 from the induction heater 26. If the plate 50 is comprised of segments mounted to the rotary conveyor 22, the insulator 52 is positioned between each of the segments. The plate 50 has a plurality of retention slots 56 positioned along an outer periphery 58 of the plate 50. More generally, the plate 50 is equipped with a plurality of workpiece retainers to hold and transfer the workpieces from the reception station 51 to a discharge station 72, 76. The plurality of workpiece retainers 56 are spaced apart a given distance to permit consistent heating of each workpiece 20, and are designed to retain a single workpiece 20 in each of the workpiece retainers 56. In one embodiment, the plate 50 is comprised of a plurality of semi-circular-shaped plates, each having slots 56 designed for a specific size workpiece 20. After exiting the track portion 48, each of the workpieces 20 are positioned in retention slots 56 of plate 50 and prevented from exiting the rotary conveyor 22 by a guide wall 60. Workpieces 20 travel along the rotary conveyor 22 in the direction shown by arrow 62. In one embodiment of the present invention, a counter 64, such as an infra-red (IR) light receiver can be included to tally the number of workpieces 20 processed.

The heater 26 may comprise an induction heating element 66 attached to a power extension bus 68. The induction heating element 66 is positioned about the rotary conveyor 22 and inductively heats each of the workpieces 20 as they rotate around the conveyor 22. The extension bus 68 connects the induction heating element 66 to the heat station 28. Preferably, the induction heating element 66 has an arc-shaped length approximately equal to one-quarter of a perimeter of the circular plate 50. After exiting the induction heating element 66, the workpieces are examined by a sensor 70 which senses the temperature of the individual workpieces. The heat sensor 70 may comprise any type of heat-sensing device, such as the aforementioned IR detector, and is in alignment with the portion of the workpiece 20 being heat-treated. The heat sensor 70 preferably provides digital feedback to the control system or control 36 and is linked to an accept/reject apparatus or ejector 72. The control 36 receives signals from the workpiece sensor 70, determines a temperature of the workpiece 20, and controls the ejector 72 in response thereto. The control 36 is also connected to the rotary conveyor 22 to control a speed of rotation to ensure adequate heating of each workpiece 20 by maintaining the time each workpiece 20 is in the heater 66.

The ejector 72 is configured to eject acceptably heat-treated workpieces 20 from the plate 50 of the rotary conveyor 22 in the direction of line 74. Workpieces 20 that are not discharged by ejector 72 continue to rotate about the rotary conveyor 22 until contacting a reject stop or reject mechanism 76, which discharges all remaining workpieces 20 in the direction of arrow 78. The rotary conveyor 22 is configured to rotate a workpiece 20 from the reception station 51 to one of the discharge stations 72, 76. The discharge stations 72, 76 eject the workpieces 20 into quench tank 24 for cooling both the acceptable pieces and the rejected pieces.

In a preferred embodiment, only adequately heat-treated workpieces 20, as sensed by the heat sensor 70 to have reached a minimum temperature, are ejected by actuation of the ejector or actuating mechanism 72. In one embodiment, the minimum temperature is approximately 1500°–1600° F. (815°–875° C.), but as one skilled in the art will readily recognize, the minimum temperature will vary according to the material composition, size, and degree of treatment desired of the workpiece. Inadequately or non-satisfactorily heat-treated workpieces that are sensed as having a less than a minimum temperature are ejected by the reject mechanism 76. However, it is also contemplated that inadequately heat-treated workpieces 20 may be ejected by the ejector 72 and that adequately heat-treated workpieces may be ejected by the reject mechanism 76.

Referring to FIG. 3, a more detailed view of the heating arrangement is shown. As previous shown, the heater 66 is positioned about the rotary conveyor 22 to heat workpieces 20 positioned in the workpiece retainers 56 of the rotary conveyor 22 while the workpieces travel from the reception station 51 to the discharge station 72, 76. As the workpieces travel about the rotary conveyor, a portion of each of the workpieces 20 is heat-treated as it moves through two coaxial conductors 80, 81. A plurality of adjustors 82 are positioned about the heater 66 to adjust a relative height of the heater 66 with respect to the rotary conveyor 22, and to adjust the coaxial conductors 80, 81 laterally with respect to the workpieces. Cooling tubes 84 run across the arc-shaped length of the heater 66 and carry water for cooling the heater 66. Coolant lines (not shown) connect the tubes 84 to the reservoir 38 of FIG. 1. The extension bus 68 is connected to the heater 66 by bolts 86 which are braised to the heater 66. An insulating slab 88 is inserted between the coaxial conductors 80, 81 and prevents electric current from flowing between the coaxial conductors 80, 81 along extension bus 68.

FIG. 4 provides a top view of a portion of the rotary conveyor 22 showing workpieces 20 traveling through the coaxial conductors 80, 81. The plate 50 and guide wall 60 combine to trap the workpieces 20 in the retention slots 56 in a locked position as they pass through the coaxial conductors 80, 81. An advantage of this arrangement is that each of the workpieces 20 are aligned consistently as they pass through the coaxial conductors 80, 81 resulting in uniform heat-treatment from piece to piece.

Figure 5:
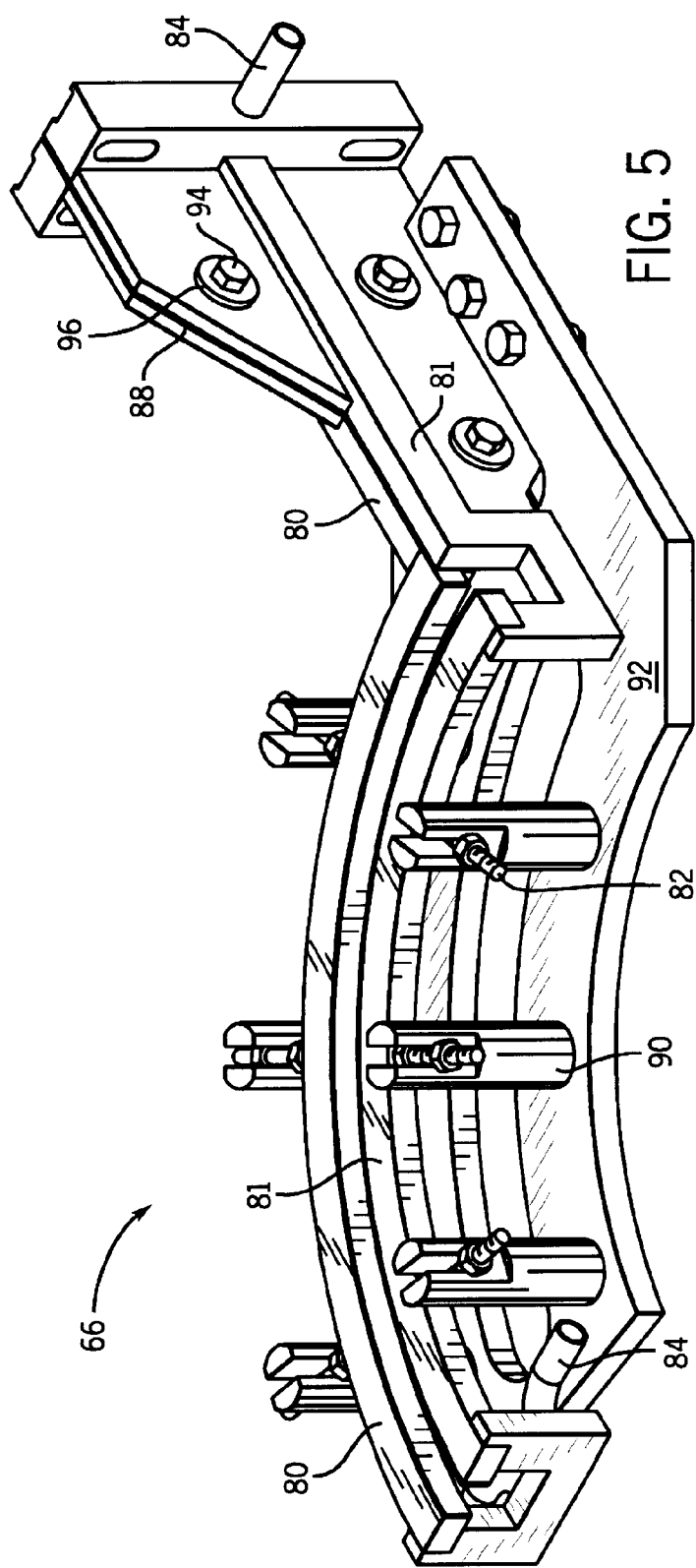
FIG. 5 is a perspective view of an induction heating coil arrangement incorporated into the device of FIG. 1.

Referring now to FIG. 5, a perspective view of the heater arrangement is provided. Pedestals 90 attach to a base 92 of the heater 66. The pedestals 90 house the adjusters 82. The adjusters 82 may be used to reposition the coaxial conductors 80, 81 relative to the workpieces 20 passing between the coaxial conductors 80, 81, and to raise and lower the conductors. In this manner, the heater 66 may be aligned with an increasing or decreasing slope. Bolts 94 are threaded through washers 96 and fasten coaxial conductor 80 to coaxial conductor 81. To prevent an electrical connection between the coaxial conductors 80, 81, the bolts 94 are comprised of a non-conducting material. Alternatively, the washer 96 can be a step washer which has an insulating core to prevent the bolts 94 from establishing an electrical connection to the coaxial conductors 80, 81.

Figure 6:
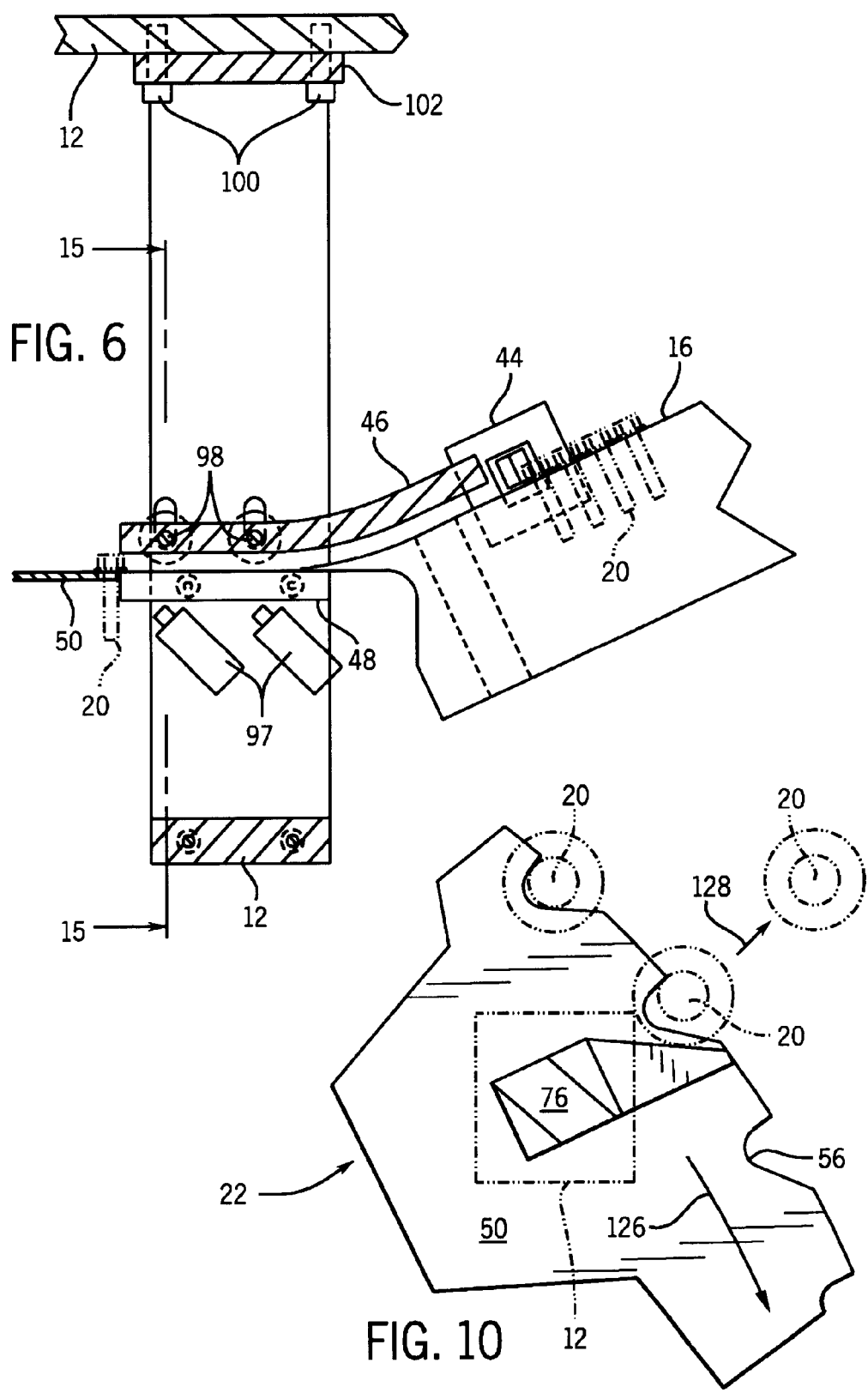
FIG. 6 is a side view taken along line 6—6 of FIG. 2.

FIG. 6 is a side view of a portion of the conveyor system further showing the overhead confinement guide 46 and track portion 48. As workpieces 20 leave the feed conveyor 16, they are deposited onto the track portion 48. The overhead confinement guide 46 directs the workpieces from the feed conveyor 16 to the track portion 48. The workpieces 20 then remain on the track portion 48 until pneumatically propelled by air jets from blowers 97 onto the plate portion 50. Overhead confinement screws 98 permit adjusting of the overhead confinement 46 so as to accommodate workpieces 20 having different head sizes. Overhead bolts 100 connect a support bar 102 to the support structure 12 so as to provide a means for adjusting the track portion 48 relative to the plate 50.

Figure 7:
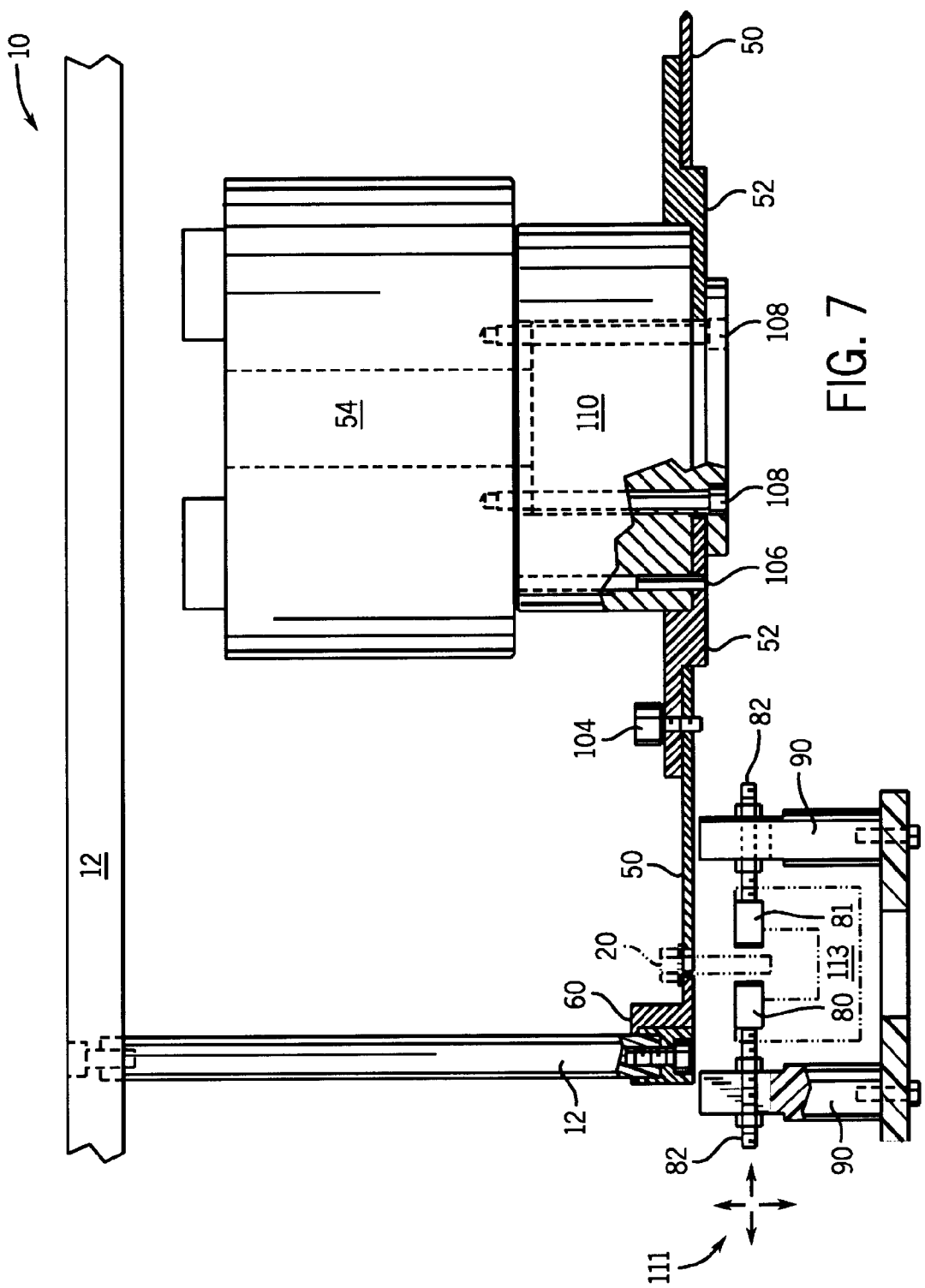
FIG. 7 is a sectional view taken along line 7—7 of FIG. 2.

Referring now to FIG. 7, a sectional view taken along line 7—7 of FIG. 2 shows the positioning of the coaxial conductors 80, 81 relative to the rotary conveyor 22. Bolt 104 connects the insulating core ring 52 to the plate 50. The drive motor 54 has a shear pin 106 and hub bolts 108 connected to its base 110. The shear pin 106 is configured to break if the plate 50 is prevented from rotating, such as if a workpiece 20 jams the rotary conveyor 22. The breaking of the shear pin 106 prevents the drive motor 54 from rotating the insulating core ring 52, thereby protecting the drive motor 54 from damage.

FIG. 7 also shows an example of a workpiece 20 passing through the coaxial conductors 80, 81. As discussed, the adjusters 82 can provide fine adjusting or repositioning of the coaxial conductors 80, 81, relative to the rotary conveyor 22, or horizontally and laterally with respect to the workpiece in the directions shown by arrows 111. In this manner, a specific portion of the workpiece 20 desired to be hardened can be heat-treated. FIG. 7 also depicts, in phantom, a U-shaped end 113 of heater 66 which allows passage of the workpieces therethrough while providing a conductive path between the coaxial conductors 80, 81.

Figure 8:
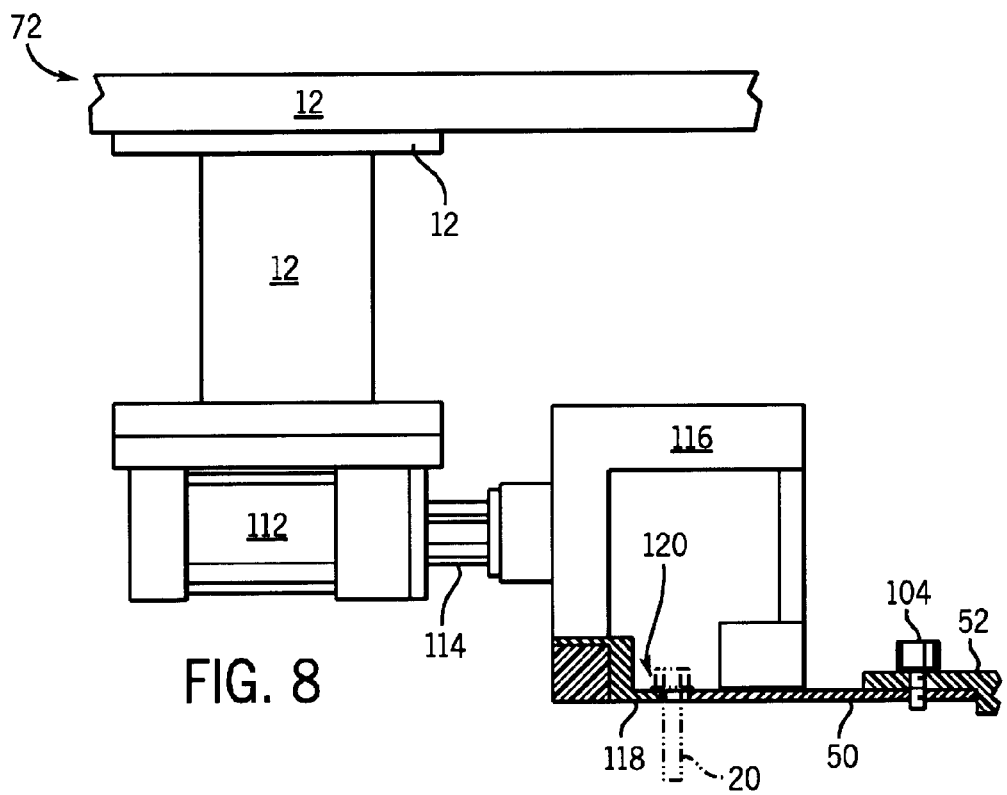
FIG. 8 is a partial side view taken along line 8—8 of FIG. 2 showing the ejector passing a workpiece.

FIG. 8 provides a partial side view of the ejector 72 taken along line 8—8 of FIG. 2. The ejector 72 comprises the base portion 112, a piston 114, an armature 116, and a side rail 118. The side rail 118 functions similarly to guide wall 60 by preventing workpieces 20 from leaving the rotating conveyor 22. A gap 120 between the plate 50 and the side rail 118 allows the passage of workpieces 20 through the ejector 72. The piston 114 is extended so that the gap 120 is sufficient in size to allow the workpiece 20 to pass through, but not exit from, the rotary conveyor 72.

Figure 9:
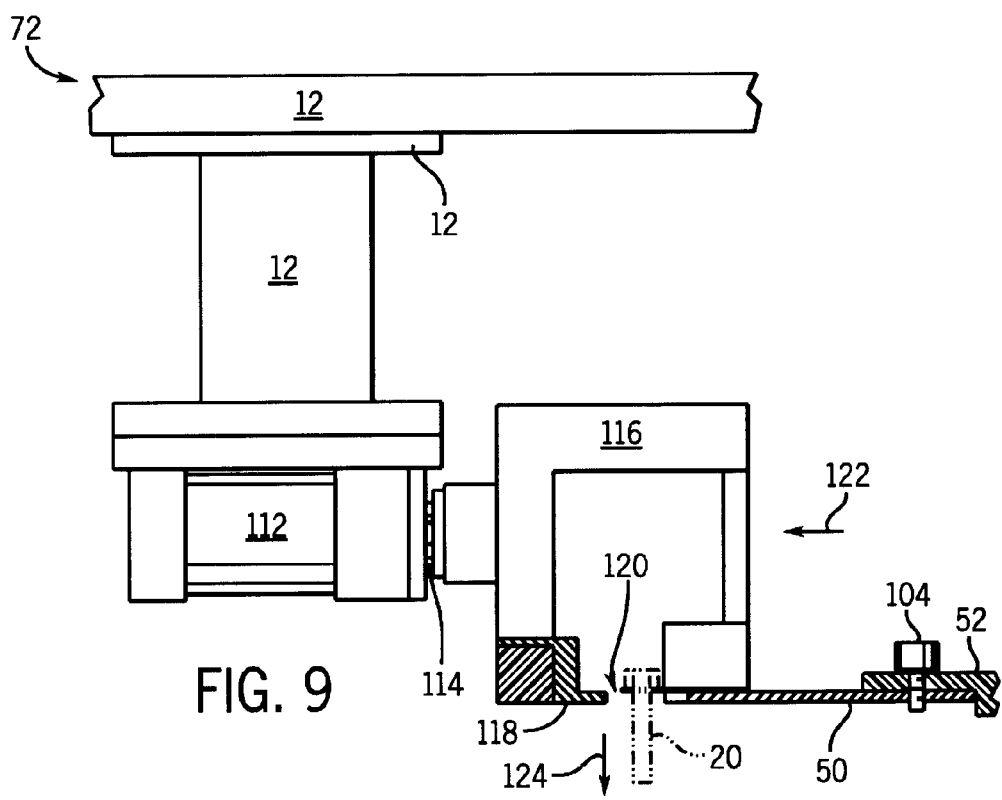
FIG. 9 is a partial side view,similar to FIG. 8, showing the ejector ejecting a workpiece.

FIG. 9 is a view similar to FIG. 8, but with the piston 114 of the ejector 72 retracted in base 112. Retraction of the piston 114 causes the armature 116 and side rail 118 to move in the direction of arrow 122 causing a larger gap 120. This larger gap 120, and the lateral movement of armature 116, causes the workpiece 20 to eject from the ejector 72 in the direction of arrow 124. In the preferred embodiment, the sensor 70 of FIG. 1 and the control 36 cause an actuation of the ejector 72, which results in the ejection of non-defective workpieces 20 along arrow 124 and into the quench tank 24.

Referring now to FIG. 10, the ejection of workpieces 20 from the rotary conveyor 22 is shown. As previously indicated, inadequately heat-treated workpieces are preferably ejected by the reject mechanism 76. As the workpieces 20 and plate 50 move in the direction of arrow 126, the workpieces 20 collide with reject mechanism 76 and are ejected in the direction of arrow 128 to the quench tank 24. The reject mechanism 76 is a stationary ejector positioned on plate 50 to eject each workpiece 20 as they pass over the reject portion of the quench tank 24.

Figure 11:
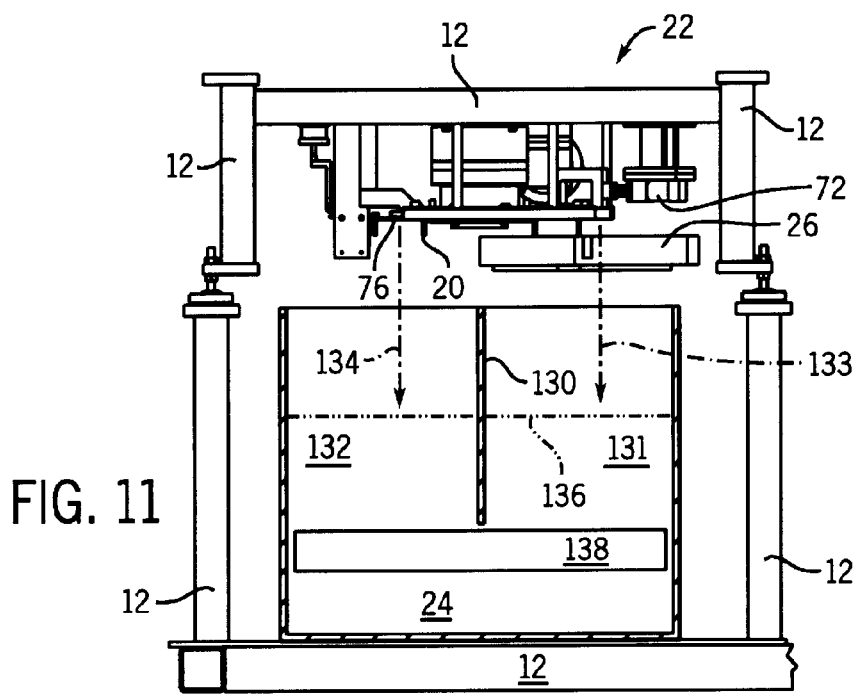
FIG. 11 is a partial sectional view of a rear portion of the device shown in FIG. 1.

A partial side view showing the positioning of the rotary conveyor 22 relative to the quench tank 24 is shown in FIG. 11. A baffle 130 is positioned within the quench tank 24. Preferably, the baffle 130 creates an accept quench tank 131 and a reject quench tank 132 therein. The accept quench tank 131 receives workpieces 20 which have reached a minimum temperature. The reject quench tank 132 receives workpieces 20 not having reached the minimum temperature. As the workpieces 20 rotate with the rotary conveyor 22, the workpieces 20 are ejected from the conveyor 22 by the ejector 72 or reject mechanism 76. Workpieces 20 removed by the ejector 72 fall in the direction of arrow 133 into the accept quench tank 131. Workpieces 20 not removed by the ejector 72 are removed by the reject mechanism 76 and fall in the direction of arrow 134 into the reject quench tank 132. Quench tank 24 can be filled with various liquids equipped to cool heated metals. Preferably, the liquid is water having a temperature in the range of 65°–85° F. (18°–30° C.), depending on the material composition of the workpiece being heat-treated. The quench tank 24 is filled up with the liquid to a fill level 136. A common lift conveyor 138 is partially positioned within the quench tank 24 to remove quenched workpieces 20 from both sides of the quench tank 24.

Figure 12:
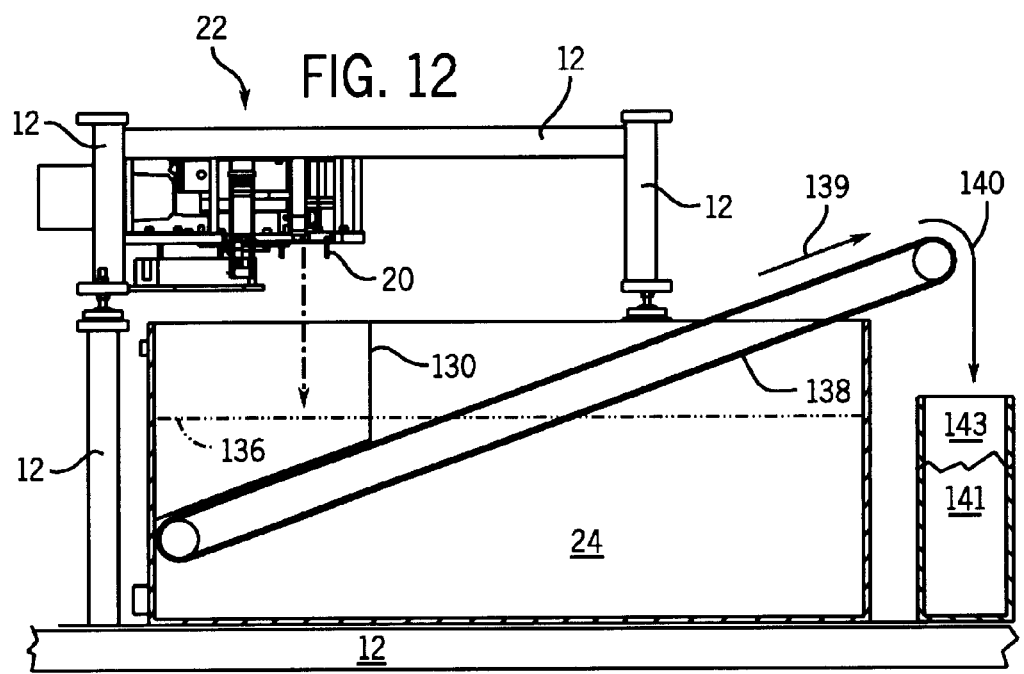
FIG. 12 is a side view, partially sectioned, of the device shown in FIG. 11.

Referring now to FIG. 12, a side view of the rotary conveyor 22 and quench tank 24 of FIG. 11 is provided. The baffle 130 prevents workpieces 20 ejected from ejector 72 from mixing with workpieces ejected from the reject mechanism 76. The baffle 130 prevents workpieces 20 ejected from ejector 72 from mixing with workpieces 20 ejected from the reject mechanism 76. The workpieces 20, after quenching in quench tank 24, are removed by conveyor 138 in the direction of arrow 140. The conveyor 138 longitudinally rotates across the accept and reject quench tanks 131, 132 to remove both accepted and rejected workpieces 20 while maintaining a separation of the accepted and rejected workpieces 20 by separately depositing the workpieces in an accept workpiece bin 141 and a reject workpiece bin 143.

FIG. 13 shows an example of one embodiment of a workpiece 20 having a head portion 142 and a shank portion 144. A plurality of screw threads 146 encircle the shank portion 144. Coaxial conductors 80, 81, shown in phantom, are positioned so as to heat-treat several of the first screw threads 146 at an end 148 of the shank portion 144. Preferably, the coaxial conductors 80, 81 are positioned to heat-treat three of the screw threads 146 of the workpieces 20. In an alternative embodiment, the workpiece 20 may have a treated shaft 144 that would extend downward from the rotary conveyor 22 during heat-treatment such that a self-tapping end 148 of the treated shaft 144 extends within the heater 26. Although now shown, such self-tapping fasteners preferably have tapered ends to assist in tapping the needed threads.

Figure 14:
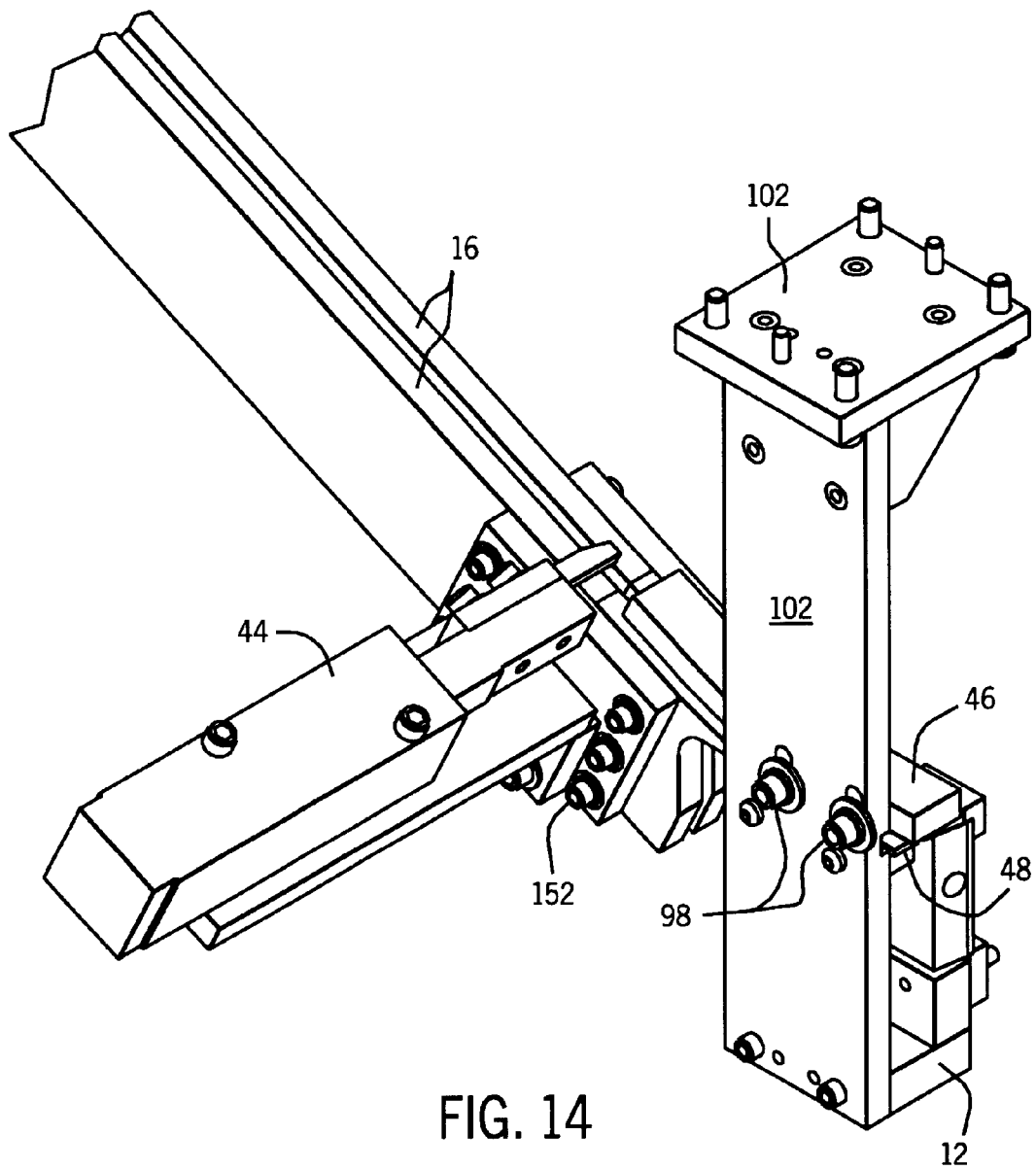
FIG. 14 is a perspective view of the feed conveyor of FIG. 1 shown connected to a track portion.

FIG. 14 is a partial perspective view showing the connection between the feed conveyor 16 and track portion 48.

As previously discussed, workpieces travel along the feed conveyor 16 until deposited onto track portion 48. Feed conveyor bolts 152 permit adjusting of the feed conveyor 16 for workpieces having different shaft sizes. Workpiece inflow stop 44 regulates the flow of workpieces into the track portion 48. The overhead confinement guide 46 directs the workpieces from the feed conveyor 16 to the track portion 48. Overhead confinement screws 98 allow adjusting of the overhead confinement guide 46 to accommodate workpieces of different head sizes.

Figure 15:
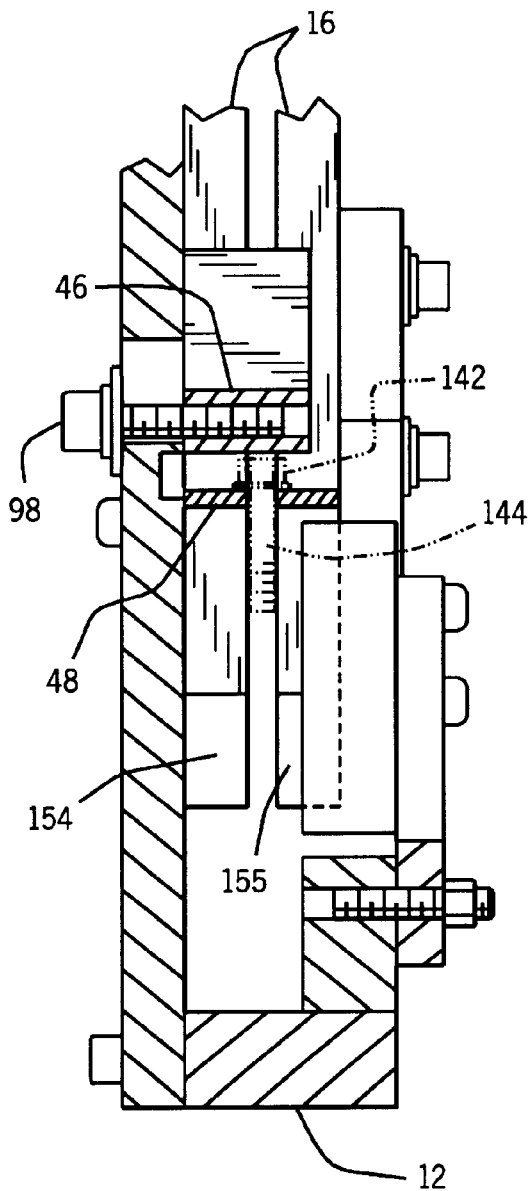
FIG. 15 is a side view, partially sectioned, of a portion of FIG. 14 showing a workpiece traveling between an overhead confinement guide and track portion in accordance with the present invention.

FIG. 15 is a side view of a portion of FIG. 14 showing a workpiece 20 traveling through the overhead confinement guide 46 and track portion 48. The head portion 142 of each workpiece is trapped between the overhead confinement guide 46 and guide track 48 as the workpiece travels from the feed conveyor 16 to the rotary conveyor. Workpiece shaft guides 154, 155 further align the shaft portion 144 of the workpiece.

Figure 16:
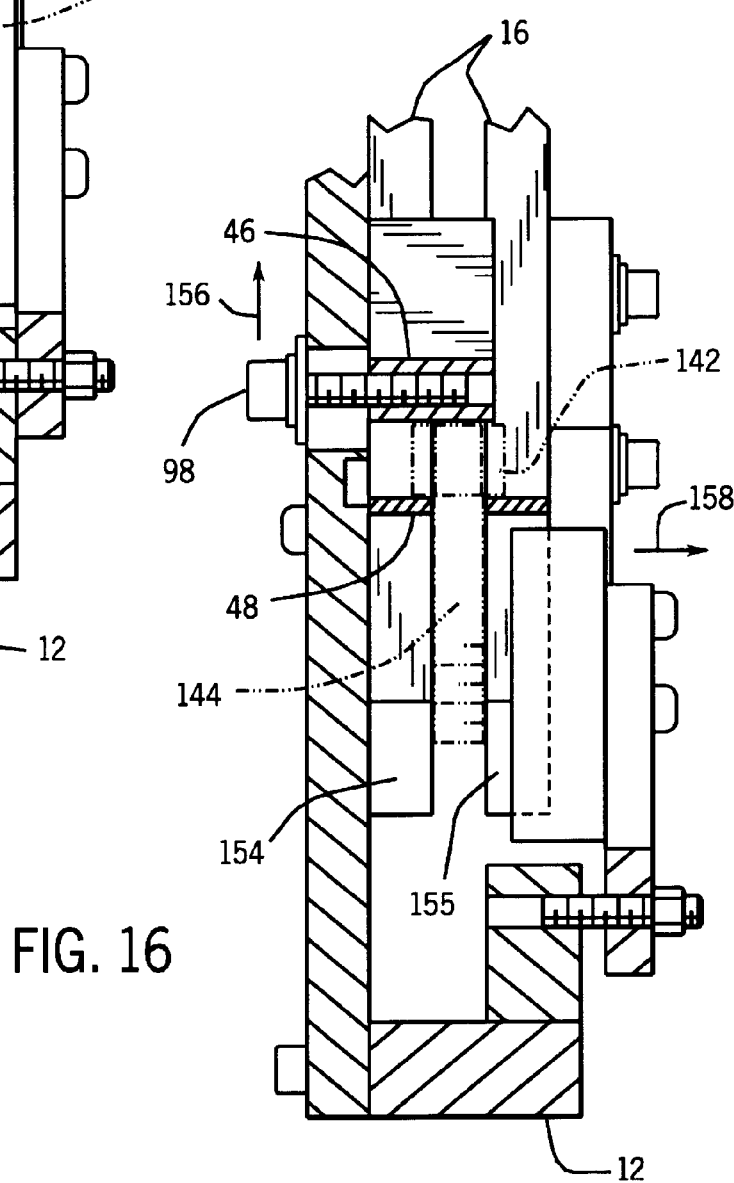
FIG. 16 is a view similar to FIG. 15 showing adjustments made to accommodate a workpiece having larger head and shaft portions.

FIG. 16 is a view similar to FIG. 15 depicting adjustments made to allow different sized workpieces through the overhead confinement guide 46 and track portion 48. The overhead confinement guide is raised along arrow 156 to permit passage of the larger head portion 142 of the workpiece. Additionally, workpiece shaft guides 155 are moved along arrow 158 to accommodate for the larger shaft portion 144.

In operation, workpieces 20 are placed in the supply bin 14 and carried along the feed conveyor 16 to the workpiece inflow stop 44 which is either open, permitting workpieces 20 to continue traveling on the feed conveyor 16, or closed preventing the flow of workpieces to the track portion 48. The inflow stop 44 regulates the flow of workpieces into the heat-treating apparatus. After passing the workpiece inflow stop 44, each of the head portions 142 of the workpieces are aligned between the overhead confinement guide 46 and track portion 48. Workpieces positioned on the track portion 48 are pneumatically fed into retention slots 56 of the plate 50 of the rotatable conveyor 22 by blowers 97. The workpieces then move with the rotatable conveyor 22 and pass through the heater 66 where each is heat treated to a given temperature by an induction heater and then ejected by either accept ejector 72 or reject mechanism 76. If the heat sensor 70 senses that the heat-treated portion of the workpiece 20 is adequately heat-treated, then the ejector 72 removes the workpiece 20 from the rotatable conveyor 22 into the accept tank 131. If the sensor 70 determines that a workpiece is not adequately heat-treated, then the workpiece passes through ejector 72 and is ejected by reject mechanism 76 into the reject quench tank 132. The inadequately heat-treated workpieces are therefore also quenched, but separately from the adequately heat-treated workpieces in the quench tank 24. A quench tank conveyor 138 removes the workpieces in separate groups from the quench tank 24.

In a preferred embodiment, the heat-treating apparatus 10 is designed so as to heat treat approximately 350 to 450 workpieces per minute. Preferably, the coaxial conductors 80, 81 operate at a temperature in the range of 1500°–1600° F.(815°–875° C.). However, this is wholly dependent on the workpiece size, composition, and intended use. Furthermore, the preferred embodiment includes a plurality of rotary plates 50 for different sized workpieces that are desired to be heat treated.

Figure 17:
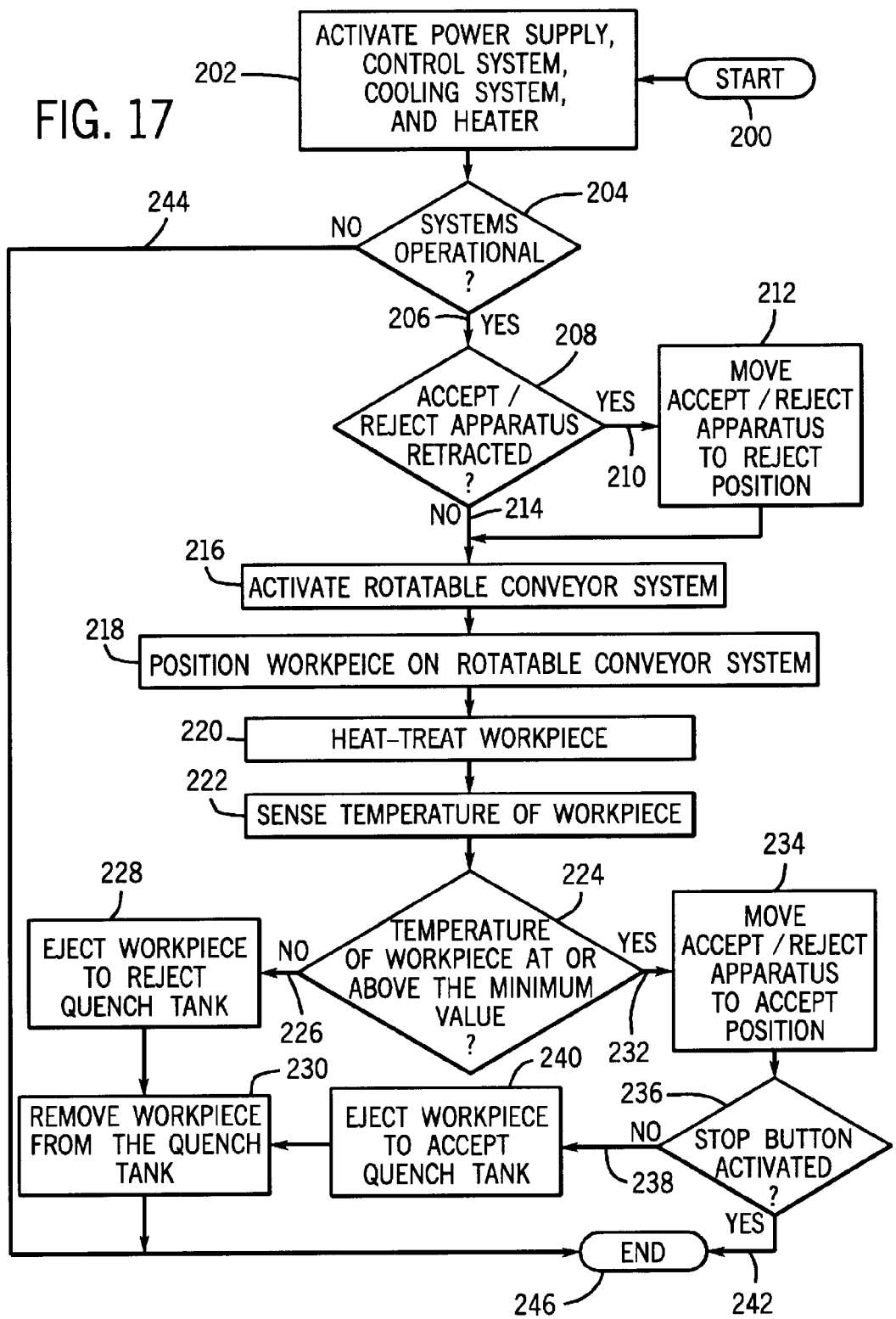
FIG. 17 is a flow chart showing a process of the present invention and implemented in the device of FIG. 1.

Referring now to FIG. 17, a flow chart showing a process of the present invention and implemented in the device of FIG. 1 is initiated at 200, which causes the activation of a power supply, heater, control system, and cooling system 202. If the systems are operating properly 204, 206, a check is made to determine whether the accept/reject apparatus is retracted 208 to an accept position, causing workpieces to fall from a rotatable conveyor system into an accept quench tank. If positioned at the accept position 208, 210, the accept/reject apparatus is moved to a reject position 212 and the rotatable conveyor system is activated 216. When the accept/reject mechanism is initially in the reject position 208, 214, the rotatable conveyor system is activated 216 without moving the accept/reject mechanism. If the systems are not fully operational at 204, it is shut-down at 244.

After activation, workpieces are positioned on the rotatable conveyor system 218 and heat-treated 220. A sensor senses a temperature of each of the workpieces 222 and determines if the temperature of each workpiece is at or above a minimum value 224. If the minimum temperature is not reached 224, 226, the workpiece is ejected by a reject mechanism into a reject quench tank 228 and removed by a conveyor.

If the minimum temperature is reached 224, 232, then the accept/reject apparatus is moved to an accept position 234. The system checks whether a stop button shutting down the device has been activated 236, and if not 236, 238, then the workpiece is ejected to the accept quench tank 240 and removed by the conveyor, ending the method at 246. If the stop button is activated 236, 242, the system automatically shuts-down, except for the cooling system which will continue to cool the heater.

In accordance with one aspect of the present invention, a heat-treating apparatus is disclosed having a rotary conveyor with a discrete number of workpiece retainers or slots and rotatable so as to transfer a workpiece from a reception station to a discharge station. A heater is positioned about the rotary conveyor to heat a workpiece positioned in one of the workpiece retainers of the rotary conveyor while the workpiece travels from the reception station to the discharge station.

In accordance with another aspect of the present invention, a system is provided to inductively heat and quench-harden at least a portion of a workpiece. The system includes a circular conveyor system and an arc-shaped induction heater positioned adjacent to the circular conveyor system. The arc-shaped induction heater heat-treats at least a portion of each workpiece traveling therethrough on the circular conveyor system. The system also includes a quencher located to receive and cool discharged workpieces from the circular conveyor system.

In another aspect of the present invention, a control for hardening workpieces is disclosed. The control causes a rotary conveyor to position and separate workpieces in aligned succession and convey the workpieces through an arc-shaped heater. The arc-shaped heater heat-treats the workpieces, which can then be cooled in a quench tank or by another cooling mechanism.

In a further aspect of the present invention, a heat-treating device is provided that includes a means for rotationally conveying workpieces in succession, and a means for heating the workpieces while being conveyed in the means for rotationally conveying. The device can also include a means for separating adequately heat-treated workpieces from inadequately heat-treated workpieces, and a means for cooling the workpieces.

In yet another aspect of the present invention, a method of heat-treating a workpiece includes positioning workpieces on a rotatable conveyor system and rotating the rotatable conveyor system such that the workpiece travels through a heater. The method further includes heat-treating at least a portion of each workpiece while in the rotatable conveyor system.

The present invention has been described in terms of the preferred embodiment, and it is recognized that equivalents, alternatives, and modifications, aside from those expressly stated, are possible and within the scope of the appending claims.

What is claimed is:

1. A heat-treating apparatus comprising:
   a rotary conveyor having a discrete number of workpiece retainers and rotatable to transfer a workpiece from a reception station to a discharge station wherein the rotary conveyor receives one workpiece after another and transfers the workpiece through the heater without incremental advancement;
   a heater positioned about the rotary conveyor to heat a workpiece positioned in the workpiece retainer of the rotary conveyor while the workpiece travels from the reception station to the discharge station;
   further comprising a workpiece sensor to sense a temperature of the workpiece; and
   further comprising a control and an accept/reject apparatus, wherein the control receives signals from the workpiece sensor, determines a temperature of the workpiece, and controls the accept/reject apparatus in response thereto.

2. The heat-treating apparatus of claim 1 wherein the heater is an induction heating element.

3. The heat-treating apparatus of claim 2 wherein the rotary conveyor includes a circular plate and the plurality of workpiece retainers are slots in the circular plate to receive a workpiece therein.

4. The heat-treating apparatus of claim 3 wherein the induction heating element has a length approximately equal to one-quarter of a perimeter of the circular plate.

5. The heat-treating apparatus of claim 2 wherein the induction heating element has an arc-shaped length.

6. The heat-treating apparatus of claim 5 wherein the induction heating element includes cooling tubes along the arc-shaped length.

7. The heat-treating apparatus of claim 1 further comprising a plurality of adjusters positioned about the heater to adjust a relative height of the heater with respect to the rotary conveyor.

8. The heat-treating apparatus of claim 2 wherein the induction heating element includes two co-axial conductors and wherein a plurality of adjusters are also capable of adjusting the co-axial conductors laterally with respect to a workpiece.

9. The heat-treating apparatus of claim 3 wherein the circular plate is comprised of a number of segments mounted to the rotary conveyor with an insulator therebetween.

10. The heat-treating apparatus of claim 1 wherein the rotary conveyor and the heater are arranged so that a shaft of the workpiece extends downwardly from the rotary conveyor and extends within the heater.

11. The heat-treating apparatus of claim 3 further comprising a plurality of interchangeable circular-shaped plates, each having therein slots designed for a particular size workpiece.

12. The heat-treating apparatus of claim 11 wherein the workpiece sensor is an IR detector.

13. The heat-treating apparatus of claim 1 further comprising a quench tank having a baffle therein to create an accept quench tank and a reject quench tank, the accept quench tank receiving workpieces having reached a minimum temperature and the reject quench tank receiving workpieces not having reached the minimum temperature.

14. The heat-treating apparatus of claim 13 wherein the quench tank includes a common lift conveyor longitudinally rotating across the accept and reject quench tanks to remove both accepted and rejected workpieces while maintaining a separation of the accepted and rejected workpieces.

15. The heat-treating apparatus of claim 1 wherein the plurality of workpiece retainers are spaced apart a given distance to permit consistent heating of each workpiece, and are designed to retain a single workpiece in each of the plurality of workpiece retainers.

16. The heat-treating apparatus of claim 1 further comprising a control connected to the rotary conveyor to control a speed of rotation to ensure adequate heating of each workpiece by maintaining each workpiece for a consistent time in the heater.

17. The heat-treating apparatus of claim 1 further comprising a feeder in operable association with the rotary conveyor to relay workpieces to the reception station.

18. The heat-treating apparatus of claim 2 further comprising:
   a drive motor to rotate the rotary conveyor; and
   an electrical isolator between the induction heating element and the rotary conveyor to electrically isolate the drive motor from the induction heating element.

19. A system to inductively heat and quench-harden at least a portion of a workpiece comprising:
   a circular conveyor system;
   an arc-shaped induction heater positioned adjacent to the circular conveyor system to heat-treat at least a portion of each workpiece traveling uniformly therethrough on the circular conveyor system;
   a quencher located to receive and cool discharged workpieces from the circular conveyor system;
   further comprising; a sensor positioned in alignment with the portion of each workpiece; and an ejector linked to the sensor; and
   wherein the quencher comprises a quench tank having a baffle therein configured to isolate adequately heat-treated workpieces from inadequately heat-treated workpieces.

20. The system of claim 19 wherein the workpieces are fasteners and the system further comprises a feed conveyor in operable association with the circular conveyor system to transfer the fasteners from a supply bin to the circular conveyor system.

21. The system of claim 19 further comprising a reject mechanism configured to remove workpieces from the circular conveyor system that have not been satisfactorily heat-treated.

22. The system of claim 21 wherein the reject mechanism is a workpiece inflow stop.

23. The system of claim 19 wherein the quencher receives and cools both acceptable workpieces and rejected workpieces and further comprises a quench tank conveyor to remove all the workpieces from the quencher.

24. The system of claim 19 wherein the sensor causes the ejector to actuate only upon detection of an adequately heat-treated workpiece based on the workpiece reaching a prescribed temperature.

25. The system of claim 19 wherein the sensor causes the ejector to actuate only upon detection of an inadequately heat-treated workpiece based on the workpiece at least one of exceeding and not reaching a prescribed temperature.

26. The system of claim 19 wherein the arc-shaped induction heater further comprises:

a heat station; and a lift mechanism configured to reposition the arc-shaped induction heater relative to the circular conveyor system.

27. The system of claim 19 wherein the circular conveyor system includes a plurality of semi-circular shaped plates having a plurality of retention slots adjacent to a guide wall of the circular conveyor system.

28. The system of claim 19 wherein the circular conveyor system comprises:

a motor driven drive assembly;

an insulating core ring secured to the motor driven drive assembly;

a plurality of notched plates secured to the insulating core ring; and a guide wall adjacent to the plurality of notched plates and configured to prevent ejection of the workpieces from the circular conveyor system.

29. The system of claim 20 further comprising a workpiece inflow stop connected to the feed conveyor to regulate the flow of workpieces along the feed conveyor.

30. The system of claim 19 further comprising a cooling system having a water reservoir and cooling tubes to transfer heat from the arc-shaped induction heater.

31. The system of claim 28 further comprising a shear pin configured to prevent rotation of the coaxial conveyor system by the motor driven drive assembly upon a breakage of the shear pin.

32. A heat-treating device comprising:

means for rotationally conveying workpieces in one-by-one succession;

means for heating the workpieces while being conveyed in the means for rotationally conveying;

comprising a means for separating adequately heat-treated workpieces from inadequately heat-treated workpieces; and wherein the means for separating adequately heat-treated workpieces from inadequately beat-treated workpieces comprises a heat sensor configured to sense a temperature of the workpieces and cause an ejector to actuate only if a predetermined temperature is reached.

33. The heat-treating device of claim 32 comprising a means for cooling the workpieces.

34. The heat-treating device of claim 32 wherein the means for rotationally conveying workpieces in succession comprises a rotary conveyor having workpiece retention slots.

35. The heat-treating device of claim 32 wherein the means for heating the workpieces comprises an arc-shaped induction heating coil.

36. The heat-treating device of claim 33 wherein the means for cooling the workpieces comprises quenching acceptable workpieces in an accept quench tank and quenching rejected workpieces in a reject quench tank.

37. A method of heat-treating a workpiece comprising:

positioning workpieces on a rotatable conveyor system;

rotating the rotatable conveyor system such that the workpiece travels through a heater at a constant rate;

heat-treating at least a portion of each workpiece while in the rotatable conveyor system;

further comprising the step of sensing a temperature of the workpiece after the step of heat-treating; and further comprising the step of separating workpieces sensed to have reached a minimum temperature from workpieces that have not reached the minimum temperature.

38. The method of claim 37 further comprising the step of quenching the separated workpieces.

39. The method of claim 37 wherein the step of heat-treating is further defined as inducing a current into the workpiece while the workpiece is moving.

40. The method of claim 37 further comprising:

aligning the workpieces in succession;

receiving the workpieces from a feed conveyor into a rotary conveyor;

spacing each workpiece in the rotary conveyor; and rotatably moving the workpieces through an arc-shaped induction heating coil.

41. The method of claim 37 further comprising the step of separating workpieces that have reached a minimum temperature from workpieces that have not reached the minimum temperature.

42. A heat-treating apparatus comprising:

a rotary conveyor having a discrete number of workpiece retainers and rotatable to transfer a workpiece from a reception station to a discharge station wherein the rotary conveyor receives one workpiece after another and transfers the workpiece through the heater without incremental advancement;

a heater positioned about the rotary conveyor to heat a workpiece positioned in the workpiece retainer of the rotary conveyor while the workpiece travels from the reception station to the discharge station;

wherein the heater is an induction heating element; and wherein the rotary conveyor includes a circular plate and the plurality of workpiece retainers are slots in the circular plate to receive a workpiece therein.

43. A heat-treating apparatus comprising:

a rotary conveyor having a discrete number of workpiece retainers and rotatable to transfer a workpiece from a reception station to a discharge station wherein the rotary conveyor receives one workpiece after another and transfers the workpiece through the heater without incremental advancement;

a heater positioned about the rotary conveyor to heat a workplace positioned in the workpiece retainer of the rotary conveyor while the workpiece travels from the reception station to the discharge station; and further comprising a quench tank having a baffle therein to create an accept quench tank and a reject quench tank, the accept quench tank receiving workpieces having reached a minimum temperature and the reject quench tank receiving workpieces not having reached the minimum temperature.

44. A system to inductively heat and quench-harden at least a portion of a workpiece comprising:

a circular conveyor system;

an are-shaped induction heater positioned adjacent to the circular conveyor system to heat-treat at least a portion of each workpiece traveling uniformly therethrough on the circular conveyor system;

a quencher located to receive and cool discharged workpieces from the circular conveyor system;

further comprising; a sensor positioned in alignment with the portion of each workpiece; and an ejector linked to the sensor, and wherein the sensor causes the ejector to actuate only upon detection of an inadequately beat-treated workpiece based on the workpiece at least one of exceeding and not reaching a prescribed temperature.

45. A system to inductively heat and quench-harden at least a portion of a workpiece comprising:

a circular conveyor system;

an arc-shaped induction heater positioned adjacent to the circular conveyor system to heat-treat at least a portion of each workpiece traveling uniformly therethrough on the circular conveyor system;

a quencher located to receive and cool discharged workpieces from the circular conveyor system; and wherein the circular conveyor system includes a plurality of semi-circular shaped plates having a plurality of retention slots adjacent to a guide wall of the circular conveyor system.

46. A system to inductively heat and quench-harden at least a portion of a workpiece comprising:

a circular conveyor system;

an arc-shared induction heater positioned adjacent to the circular conveyor system to heat-treat at least a portion of each workpiece traveling uniformly therethrough on the circular conveyor system;

a quencher located to receive and cool discharged workpieces from the circular conveyor system; and wherein the circular conveyor system comprises:

a motor driven drive assembly;

an insulating core ring secured to the motor driven drive assembly;

a plurality of notched plates secured to the Simulating core ring; and a guide wall adjacent to the plurality of notched plates and configured to prevent ejection of the workpieces from the circular conveyor system.

* * * * *

UNITED STATES PATENT AND TRADEMARK OFFICE
CERTIFICATE OF CORRECTION

PATENT NO.    : 6,620,374 B2
DATED         : September 16, 2003
INVENTOR(S)   : Stefanac et al.

It is certified that error appears in the above-identified patent and that said Letters Patent is hereby corrected as shown below:

Column 12,
Line 40, delete "beat-" and substitute therefor -- heat- --;

Column 13,
Line 38, delete "beat-treated" and substitute therefor -- heat-treated --;

Column 15,
Line 2, delete "beat-treated" and substitute therefor -- heat-treated --;

Signed and Sealed this

Eleventh Day of November, 2003

JAMES E. ROGAN
*Director of the United States Patent and Trademark Office*